United States Patent
Jenkins et al.

(10) Patent No.: US 6,728,747 B1
(45) Date of Patent: Apr. 27, 2004

(54) METHOD AND SYSTEM FOR IMPLEMENTING FAILOVER FOR DATABASE CURSORS

(75) Inventors: Robert Jenkins, Foster City, CA (US); Mehul Bastawala, Menlo Park, CA (US); Srinath Krishnaswamy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/144,680

(22) Filed: May 10, 2002

Related U.S. Application Data

(63) Continuation-in-part of application No. 08/866,842, filed on May 30, 1997, now Pat. No. 6,490,610.

(51) Int. Cl.[7] .................................................. G06F 9/00
(52) U.S. Cl. ........................ 709/101; 709/102; 709/104; 709/201; 709/202; 709/203; 709/226; 709/227; 707/10; 707/202; 714/2; 714/16
(58) Field of Search ................................ 709/227, 101, 709/104, 204, 205, 206, 207, 102, 201–203, 226; 707/10, 202; 714/2, 16

(56) References Cited

U.S. PATENT DOCUMENTS

| | | | |
|---|---|---|---|
| 3,444,528 A | 5/1969 | Lovell et al. |
| 4,868,832 A | 9/1989 | Marrington et al. |
| 5,157,663 A | 10/1992 | Major et al. |
| 5,179,660 A | 1/1993 | Devany et al. |
| 5,247,664 A | 9/1993 | Thompson et al. |
| 5,535,326 A | 7/1996 | Baskey |
| 5,544,313 A | 8/1996 | Shachnai et al. |
| 5,566,225 A | 10/1996 | Haas |
| 5,566,297 A | 10/1996 | Devarakonda et al. |
| 5,596,720 A | 1/1997 | Hamada et al. |
| 5,633,999 A | 5/1997 | Clowes et al. |
| 5,652,908 A | 7/1997 | Douglas et al. |
| 5,666,479 A | 9/1997 | Kashimoto et al. |
| 5,696,895 A | 12/1997 | Hemphill et al. |
| 5,721,918 A | 2/1998 | Nilsson et al. |
| 5,734,896 A | 3/1998 | Rizvi et al. |
| 5,784,630 A | 7/1998 | Saito et al. |
| 5,796,934 A | 8/1998 | Bhanot |
| 5,796,941 A | 8/1998 | Lita |
| 5,796,999 A | 8/1998 | Azagury |
| 5,819,019 A | 10/1998 | Nelson |
| 5,832,483 A | 11/1998 | Barker |
| 5,850,507 A | 12/1998 | Ngai et al. |
| 5,862,362 A | 1/1999 | Somasegar et al. |
| 5,867,713 A | 2/1999 | Shrader et al. |
| 5,870,545 A | 2/1999 | Davis et al. |
| 5,890,963 A | 4/1999 | Yen |
| 5,951,694 A | 9/1999 | Choquier et al. |
| 6,038,677 A | 3/2000 | Lawlor et al. |
| 6,047,323 A | 4/2000 | Krause |
| 6,199,110 B1 | 3/2001 | Rizvi et al. |

OTHER PUBLICATIONS

Jenkins, Bob, "Hash Functions", Dr. Dobb's Journal, Sep. 1997, pp. 107–109, 115–116.

"Coda: A Highly Available File System for a Distributed Workstation Environment", Mahadev Satyanarayanan, IEEE Transactions on Computers, vol. 39, No. 4, pp. 447–459, Apr. 1990.

(List continued on next page.)

*Primary Examiner*—Nabil El-Hady
(74) *Attorney, Agent, or Firm*—Bingham McCutchen LLP

(57) ABSTRACT

A method and system for implementing failover in a computer system is provided. For a failover involving an order-sensitive dataset or application, a mechanism is provided to detect order inconsistencies between a first set of data and a second set of data, in which the first set of data corresponds to a first connection established before the failover and the second set of data corresponds to a second connection established after the failover.

66 Claims, 7 Drawing Sheets

OTHER PUBLICATIONS

"Scalable, Secure, and Highly Available Disributed File Access", Mahadev Satyanarayanan, IEEE Transactions on Computers, vol. 23 5, pp. 9–21, May 1990.

"Distributed Systems, Concepts and Designs", Coulouris et al., 1994, Adison–Wesley.

"Local Area Network Server Replacement Procedure", IBM Technical Disclosure Bulletin, Jan. 1995.

"Workload Balancing in a Distributed Environment", IBM Technical Disclosure Bulletin, Nov. 1995.

"High Availability in Clustered Multimedia Servers", Renu Tewari et al., (IEEE), Mar. 1996, pp. 645–654.

622

| ROW | CHECKSUM FOR ROW | CUMULATIVE CHECKSUM $C = C + CHECKSUM\ (ROW\text{-}VALUE)$ | ORDER-DEPENDENT CHECKSUM $C_0 = C + CHECKSUM\ (\ C_0, ROW\text{-}VALUE)$ |
|---|---|---|---|
| 1 | 30 | 30 | 5 |
| 2 | 36 | 66 | 23 |
| 3 | 41 | 107 | 43 |

624

| ROW | CHECKSUM FOR ROW | CUMULATIVE CHECKSUM $C = C + CHECKSUM\ (ROW\text{-}VALUE)$ | ORDER-DEPENDENT CHECKSUM $C_0 = C + CHECKSUM\ (\ C_0, ROW\text{-}VALUE)$ |
|---|---|---|---|
| 1 | 30 | 30 | 5 |
| 2 | 41 | 71 | 31 |
| 3 | 36 | 107 | 53 |

*FIG. 6*

METHOD AND SYSTEM FOR IMPLEMENTING FAILOVER FOR DATABASE CURSORS

CROSS-REFERENCE TO RELATED APPLICATIONS

This is a continuation-in-part of U.S. Pat. No. 6,490,610, field May 30, 1997, entitled AUTOMATIC FAILOVER FOR CLIENTS ACCESSING A RESOURCE THROUGH A SERVER, issued Dec. 3,2002, which is hereby incorporated by reference in its entirety.

BACKGROUND AND SUMMARY

A typical client-server database system includes a client, a database server, and a database. The client portion includes two main components, a database application and a client driver interface. The database application issues database language commands, such as SQL (Structured Query Language) commands, and provides an interface to a user through a keyboard, screen, and pointing devices such as a mouse. The client driver interface, on the other hand, provides the connection and communication interface between the client and the database server.

A connection is a communication pathway between a client and a database server and a specific connection between a client and a database server is termed a database session. The database server responds to the database language commands sent from the client by executing database operations for accessing and manipulating a physical database. A logical unit of work that is comprised of one or more database language commands is often referred to as a transaction.

Contained within the database server is the session state data that reflects the current transaction state of the database session. To initiate a database session, a "log on" procedure may be performed to establish a new database session by connecting a client with a database server.

Normally, the database session lasts from the time the user connects until the time the user disconnects or exits the database application. However, if a database session failure occurs, the connection between the client and the database server is lost. Once the database session fails, the user will observe a visible interrupt in his service as access to the database is terminated. To continue accessing the database, the user must reconnect a client to an active database server. This may require human intervention to manually log back onto the system to establish a new database session.

Besides requiring human intervention to manually log back onto the system, the failure of a database session creates other significant problems to the user. Because the logon process creates a new database session, all previous transactions that were not complete at the time of the failure are lost. Thus the user must resubmit all lost transactions once the connection to the database is reestablished.

Based on the foregoing, it is desirable to provide a mechanism for handling the failure of a database session without requiring someone to perform manual reconnection steps. Additionally, it is also desirable for users not to lose session state data on the occurrence of a database session failure.

A method, system, and apparatus is provided for passing a client from a first server to which the client was connected for accessing a resource, to a second server for accessing the resource. While executing, the first server ceases to respond to the client. After the client detects that the first server has ceased to respond to the client, the client is automatically connected with the second server that has access to the resource. After automatically connecting the client, the client accesses the resource through the second server. In one embodiment, the client stores information about the state of the session with the first server so that processing can continue where it left off after the client connects with the second server. The client may be pre-connected to the second server prior to the failure of the first server to reduce the latency caused by switching in response to a failure. The second server may be configured to pre-parse the commands that the client issues to the first server to further reduce the latency associated with switching to the second server.

A method and system for implementing failover in a computer system is provided. In an embodiment, for a failover involving an order-sensitive dataset or application, a mechanism is provided to detect order inconsistencies between a first set of data and a second set of data, in which the first set of data corresponds to a first connection established before the failover and the second set of data corresponds to a second connection established after the failover. Other and additional aspects, objects, and details of the invention are described below in the detailed description, figures, abstract, and claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a diagram illustrating how order-dependent checksums can be utilized to detect inconsistencies in row ordering for a re-executed query result set according to one embodiment of the invention.

DETAILED DESCRIPTION OF THE PREFERRED EMBODIMENT

A method and apparatus for implementing an automatic failover mechanism for a resource is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Automatic Failover

An automatic failover system is a mechanism that can detect a failed connection between a client and a database server and automatically and transparently create a new database session by reconnecting the client to an active database server. The automatic failover mechanism can eliminate the burden of manually re-logging onto the database system whenever a database session failure occurs. In addition, the automatic failover mechanism can provide a method for completing commands and transactions that were interrupted by the database session failure.

Figure 2:
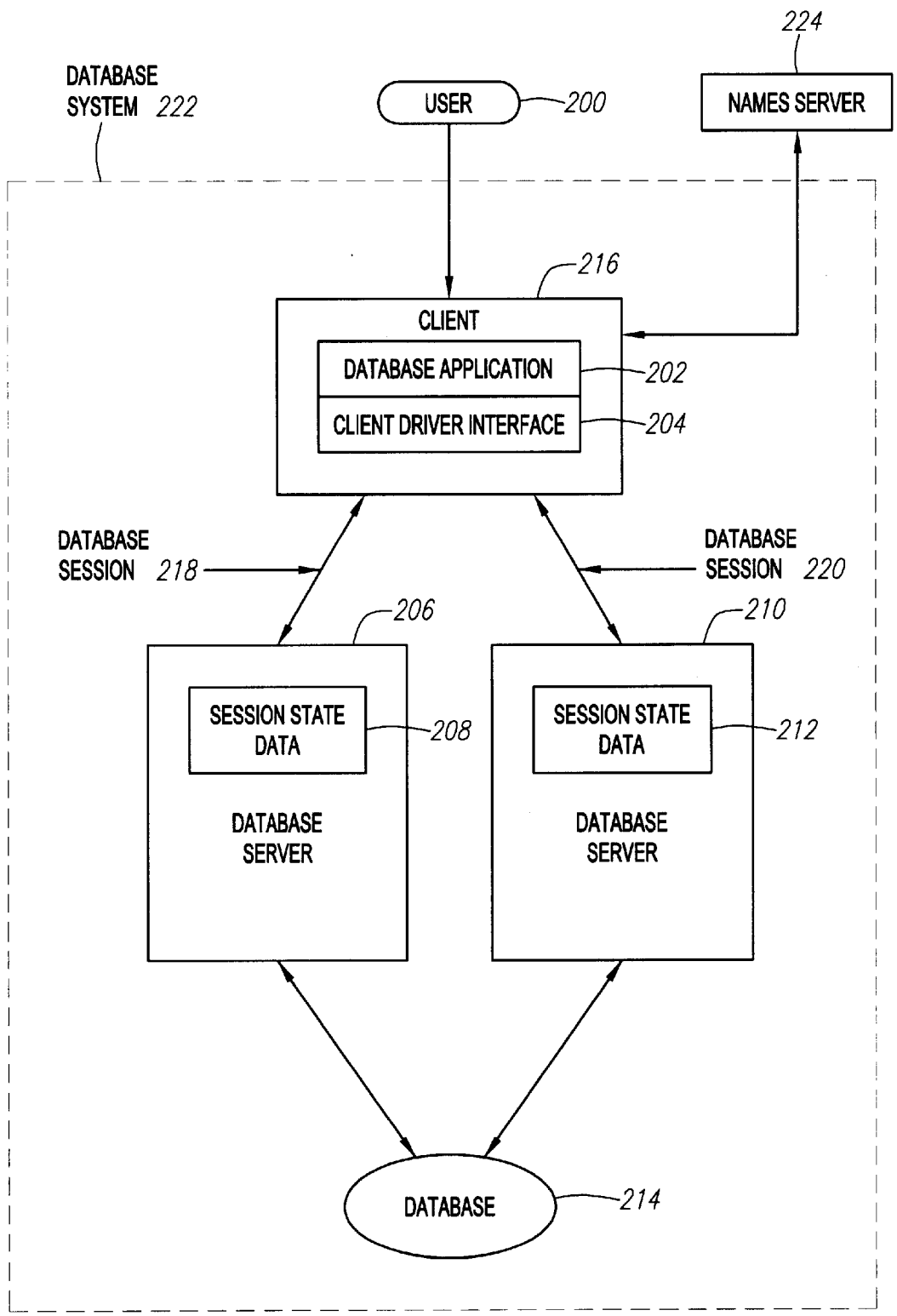
FIG. 2 is a block diagram of a database system in which a client is connected to a database server to provide access to a database.

FIG. 2 is an illustration of a database system 222 that supports automatic failover according to one embodiment of the invention. Database server 206 and database server 210 represent two database servers that can provide access to a particular database 214. Client 216 includes database application 202 and client driver interface 204. Database application 202 provides user 200 an interface into database 214 by generating database language commands based on input from user 200 and displaying to user 200 data retrieved from database 214 in response to the database language commands.

Client driver interface 204 is connected to and communicates with database server 206 and database server 210 through database session 218 and database session 220, respectively. Session state data 208 and session state data 212 are respectively contained within database server 206 and database server 210 and reflect the current command and transaction state of database session 218 and database session 220 respectively. Names server 224 contains active database server addresses that may be used by clients to access database 214.

Automatic Failover Sequence

Figure 3:
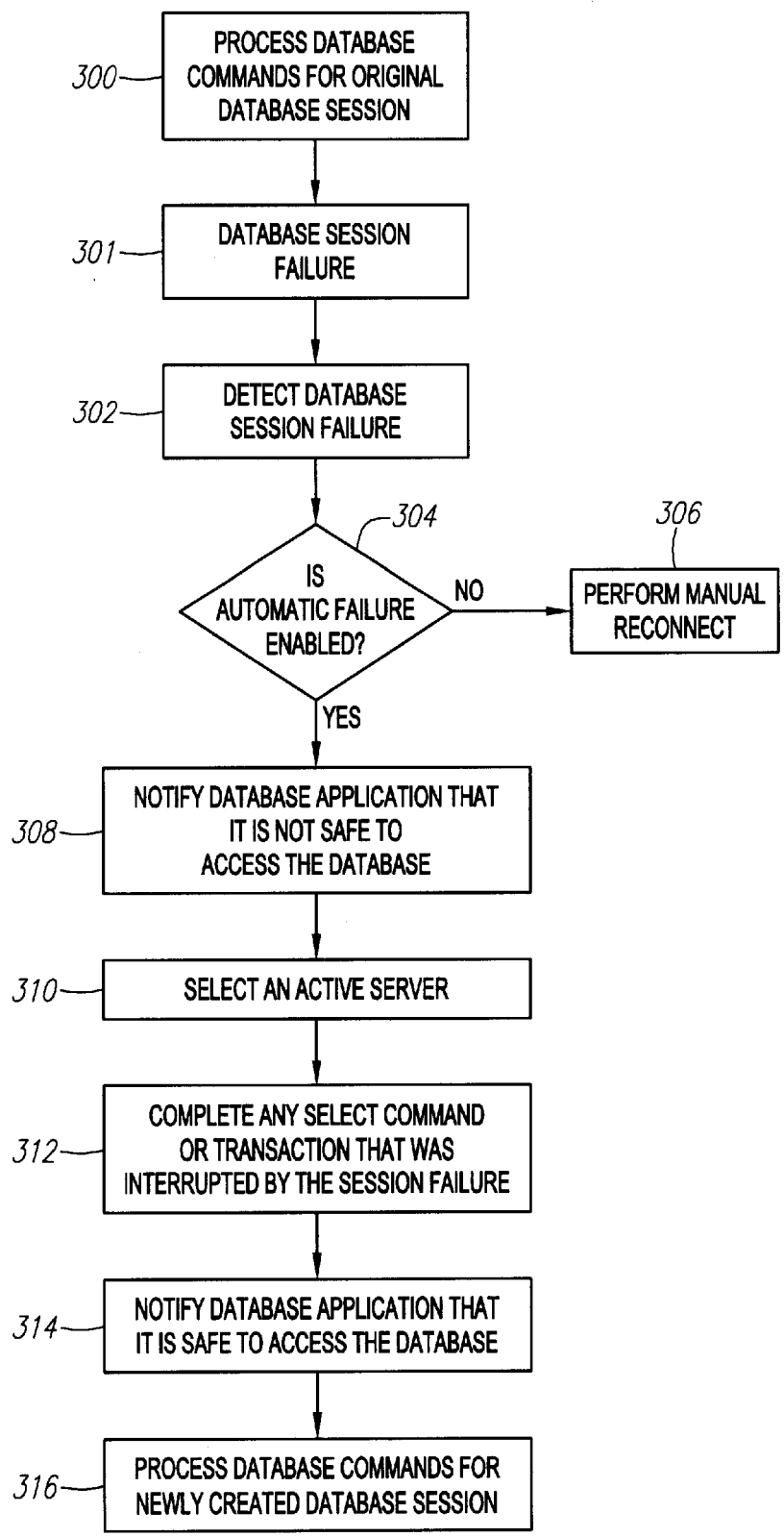
FIG. 3 is a flow chart illustrating steps performed in response to a database server failure according to an embodiment of the invention.

FIG. 3 is a flow diagram illustrating the manner in which an automatic failover mechanism may be implemented according to one embodiment of the invention. According to one embodiment as described in FIG. 3, the configuration of database system 222 before an occurrence of a database session failure is such that client 216 only has access to database 214 by way of database server 206 and database session 218. User 200 accesses database 214 by interacting with the user interface of client 216, causing client 216 to submit database language commands through database session 218.

At step 300, client driver interface 204 is configured to process database language commands that correspond to input from user 200. Client driver interface 204 conveys these database language commands to database server 206 through database session 218. Client driver interface 204 is responsible for establishing and reestablishing the connection and communication controls for interfacing client 216 with database server 206 and, after failure of database session 218, to database server 210. In addition, client driver interface 204 is required to initialize database server 210 and session state data 212 if database session 218 fails.

For example, in one embodiment, client driver interface 204 maintains a record of the state of every command or transaction sent over session 218 that has not completed. When database session 218 fails, this record enables client driver interface 204 to transfer and reestablish the state of interrupted commands or transactions onto database server 210 and session state data 212. Once database server 210 and session state data 212 are initialized, client driver interface 204 can cause the interrupted commands or transactions to continue processing, or at least attempt to continue processing, by communicating commands through database session 220.

At step 301, a failure of database session 218 occurs and the connection between client 216 and database server 206 is lost. At step 302, client driver interface 204 detects the failure of database session 218.

Various techniques may be used to allow client driver interface 204 to detect a failure of database session 218. For example, according to one embodiment, client driver interface 204 asserts a callback request when initiating the connection to database server 206. The connection from client driver interface 204 to database server 206 is through database session 218. The callback request notifies client driver interface 204 when database session 218 fails.

In an alternate embodiment, client driver interface 204 detects a failure of database session 218 by maintaining a timer which times-out when database server 206 fails to respond within a specified amount of time. Client driver interface 204 may then verify that database session 218 actually failed and that the interface did not time-out for another reason.

At step 304, client driver interface 204 verifies that automatic failover is enabled. In one embodiment, user 200 can select whether or not automatic failover is performed on the failure of database session 218. If user 200 has not selected automatic failure and database session 218 fails, not only will manual steps will be required to log back onto database system 222, but session state data 208 will also be lost. Otherwise, in one embodiment, if user 200 enables automatic failover, in step 308 client driver interface 204 notifies database application 202 that it is not safe to continue accessing database 214 through session 218. Client driver interface 204 may also cause user 200 to be notified that database session 218 has failed and that an automatic failover is being performed.

At step 310, client driver interface 204 selects database server 210 to reestablish access to database 214. Various techniques may be used for selecting a database server that allows access to the same resource (database 214) that was being accessed during the failed session.

In one embodiment, a names server 224 is used to determine an appropriate database server to use after a session 218 fails. Names server 224 maintains a list of active servers that can be connected to access to database 214. After obtaining the address of database server 210 from names server 224, client driver interface 204 automatically connects to database server 210 creating database session 220.

When selecting an active database server after the failure of database session 218, client driver interface 204 is not required to choose a different database server (database server 210), from the previously connected database server (database server 206). Although database system 222 depicts client 216 connecting to a different database server (database server 210) when database session 218 fails, database server 206 and database server 210 may actually be the same database server, where database server 210 represents database server 206 after the failure. Thus, when database session 218 fails, client driver interface 204 may choose to reconnect to database server 206 if client driver interface 204 determines that database server 206 is currently active. Database server 206 will be available for reconnecting client 216 to database 214 if, for example, session 218 failed independent of database server 206. Alternatively, database server 206 may become available for reconnecting client 216 to database 214 after recovering from a failure.

For example, client driver interface 204 is connected to database server 206 through database session 218. User 200, although still logged on to database system 222, ceases to access database 214 for some period of time. During this period of time, a backup of database 214 is initiated causing database session 218 to fail. Before user 200 returns to access database 214, the backup of database 214 is completed. When user 200 begins to access database 214, client driver interface 204 may identify database server 206 as active. Client driver interface 204 may then establish database session 218 by reconnecting client 216 to database server 206.

In another embodiment, client driver interface 204 selects database server 210 from a pool of database servers that have access to database 214. The pool of "backup" servers may be established, for example, when user 200 initially logs on. Client driver interface 204 then automatically performs the necessary steps to connect to database server 210 through database session 220. The connection pool can reduce the overhead required in connecting client driver interface 204 to a new database server after the occurrence of a database session failure.

In yet another embodiment, client driver interface 204 is connected with both database server 206 and database server 210 when user 200 initially logs on. The database application 202 interacts with the database 214 through database server 206 over session 218. When session 218 fails, database server 206 then switches to database connection 220 that has already been established. As shall be described in greater detail hereafter, commands issued to database server 206 in session 218 may be pre-parsed in database server 210 to further reduce the overhead associated with switching from database server 206 to database server 210.

At step 312, any select command or transaction that was interrupted by the failure of database session 218 continues processing. In one embodiment, client driver interface 204 maintains a record of the current select commands and transactions being performed. This record provides client driver interface 204 the ability to continue processing any select command or transaction that was interrupted by the failure of database session 218. By replicating the interrupted select commands and transactions on database server 210 once database session 220 is established, client driver interface 204 can continue processing any interrupted select commands or transactions. Because client driver interface 204 can automatically resubmit any interrupted select command or transaction, the process can be transparent to user 200 as manual steps will not be required to resubmit the information.

Select Operation Recovery

Select commands provide users the ability to selectively retrieve specific categories of information or data from a database. Ordinarily, a select command returns the requested data in rows that correspond to the specific attributes of the select command. For example, in the select command "select*from t1 where t1·c1=100," the specific attributes of the select command return all rows of data from table t1 where the column 1 of table t1 is equal to 100.

Because the information in a database is constantly changing, a user cannot normally be guaranteed to receive the same data from one select command to the next, even if both select commands contain the same select attributes. Thus, results returned in response to execution of a select command reflect a particular snapshot of the database (i.e. the database at a specific instance in time).

When a select command is executed, a time stamp or sequence number is used to determine the specific snapshot or state of the database from which data will be retrieved during the execution of the select command. This database timestamp represents a specific state of the database and allows a database server to retrieve consistent data, even as information in the database is modified.

The timestamp used during the processing of one select command can also be used by a database sever to retrieve the same information when executing subsequent select commands. However, although using the same database timestamp to select separate executions of a select statement guarantees that the two executions return the same information, the order in which rows are returned cannot be guaranteed. In other words, the row order of data returned by a select command is not deterministic.

Figure 4:
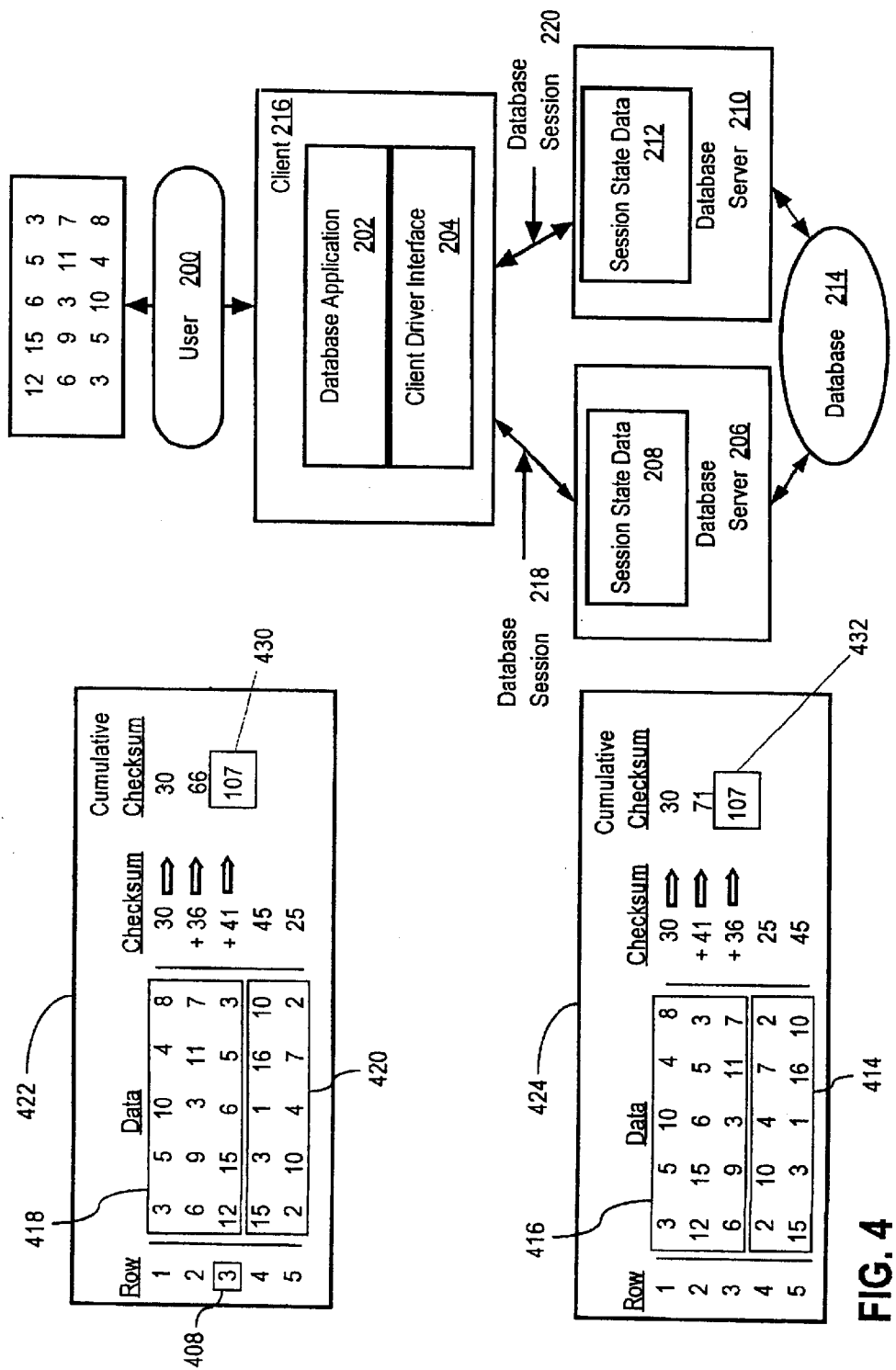
FIG. 4 is a diagram illustrating how checksums can be utilized for completing select commands that were interrupted by a database session failure according to an embodiment of the invention.

To continue processing an interrupted select command, a client must be able to determine which rows of data were previously received from the failed database session, and whether the ordering of rows from a subsequent execution of the select command will enable the client to continue processing from the point of interruption. FIG. 4 illustrates one embodiment in which checksums can be utilized to enable a client to continue processing an interrupted select command. This view is similar to that of FIG. 2, and like reference numerals are employed to refer to like components.

According to one embodiment, whenever a client requests a select command to be executed by a database server, the database server returns to the client a database timestamp that reflects the snapshot of the database used to process the particular select command. The database timestamp is stored by the client and can be used to guarantee that a subsequent select command will return the same information as the previously executed select command, as long as both select commands employ the same select attributes.

In addition to the database timestamp, the client maintains both a row count and a cumulative row checksum. The row count indicates the number of rows successfully returned to the client in response to the initial execution of the select statement. The cumulative row checksum is a cumulative checksum of all rows successfully returned to the client. If a database session fails while executing a select command, the client uses the row count and cumulative row checksum to determine if a subsequent select command can be used to continue processing from the point of interruption.

For example, when user 200 requests the processing of a select command through database application 202, client driver interface 204 submits an initial select command to database server 206 for execution through database session 218. Database server 206 executes the select command by retrieving the requested select data from database 214 and returns to client driver interface 204 a database timestamp that reflects the snapshot of the database used during the execution of the initial select command.

Database server 206 then begins transferring rows of select data back to client driver interface 204 in response to fetch commands received from the client. As rows of select data are received from database server 206, client driver interface 204 delivers the information to user 200. As each row of select data is received and then delivered to user 200, client driver interface 204 increments a row counter and calculates a cumulative checksum.

If database session 218 fails and the initial select command is interrupted before client driver interface 204 receives all of the select data, client driver interface 204 connects to database server 210 through database session 220 and attempts to continue processing the select command from the point of interruption. Once connected to database server 210 through database session 220, client driver interface 204 resubmits the select command to database server 210 along with the stored database timestamp.

The database server 210 executes the select command using a snapshot of the database that corresponds to the timestamp. As the resubmitted select command is executed and rows of data are fetched from database server 210, client driver interface 204 counts the number of returned rows and a maintains a second cumulative checksum. When the number of rows returned equals the number of rows previously returned, client driver interface 204 compares the second cumulative checksum with the previously stored cumulative checksum to determine whether the rows returned in response to the re-execution of the select statement are the same as the rows that were previously returned to the user. If so, then the results returned by the resubmitted select command are the same as the results previously returned by the initial select command. Thus, the results of the resubmitted select command may continue to be fetched to continue processing from the point of interruption.

As shown in FIG. 4, data 422 represents the initial select command that was interrupted by the failure of database session 218 while attempting to return five rows of select command data to client driver interface 204. Data 418 represents the three rows of data that were returned to client driver interface 204, before database session 218 failed and data 420 represents the two rows of data that had not been returned to client driver interface 204 before the failure of database session 218. Cumulative checksum 430 is the cumulative row checksum of data 418 and row count 408 is the number of rows of data that were returned to client driver interface 204 before database session 218 failed.

Data 424 depicts the resubmitted select command using the stored database timestamp and the order of rows returned to client driver interface 204 from database server 210. Data 416 represents the first three rows of data and data 414 represent the last two rows of data returned to client driver interface 204 after connecting to database session 210. Cumulative checksum 432 represents the cumulative row checksum of data 416, corresponding to the first three rows of data returned to client driver interface 204 after executing the resubmitted select command.

In the current example, although the row order of data 418 does not match the row order of data 416, cumulative checksums 430 and 432 are equal. Therefore, client driver interface 204 is assured that data 414 represents the two rows of data (data 420), that were not returned to client driver interface 204 before database session 218 failed. Thus, in this particular instance, client driver interface 204 can continue processing the interrupted select command and return to user 200 only those rows of data that were not previously returned when database session 218 failed.

However, in one embodiment, if cumulative checksums 430 and 432 are not equal, client driver interface 204 cannot continue processing the select command from the point that database session 218 failed. In this case, client driver interface 204 causes database server 210 to redeliver all rows of data from the resubmitted select command. Client driver interface 204 then returns the complete set of select data back to user 200.

In yet another embodiment, when cumulative checksums 430 and 432 are not equal, client driver interface 204 notifies user 200 that a database session failure occurred and that the interrupted select command cannot be completed. User 200 must then resubmit another select command with the corresponding attributes.

Failover for Order-sensitive Resourses

As noted above, when separately executing a given query against a set of data, it is possible that a first execution of the query will return the rows of the result set in a different order than a second execution of that same query, even if the two executions are against the same set of data at the same database timestamp. To ensure that a client can continue using a prior result set after a failover in one embodiment, both a row count and a cumulative row checksum is maintained by the server when returning rows of data to a client. The row count indicates the number of rows successfully returned to a client in response to an execution of a query statement. The cumulative row checksum is a cumuative checksum of all rows successfully returned to the client. After a failover, the row count and cumulative checksum are evaluated to determine if processing can continue from the point of interruption. In one embodiment, cumulative checksums (C) are calculated according to the following approach:

Initially C=0
When adding rows x . . . y to existing cache with rows 1 . . . (x−1)
For (row i from x . . . y)
C=C+checksum(column values of row i);

In the above approach, "checksum" is an example of a checksum function and "column values of row i" is an argument of the "checksum" function.

To illustrate this aspect according to an embodiment of the invention, FIG. 4 shows first data 422 responsive to a database query that was interrupted by a failure. As shown in the figure, the checksum for the first row of data has a value of "30," and therefore the cumulative checksum for the first row of data is also "30". The checksum for the second row of data is "36," resulting in a cumulative checksum of 66 (i.e., prior cumulative checksum of 30 plus current checksum value of 36). The checksum for the third row of data is "41," resulting in a cumulative checksum for the third row of 66+41=107. After the third row is successfully transmitted to the client, the client will maintain a row count of "3" to indicate that three rows of data have been successfully transmitted, and will also maintain the cumulative checksum value of "107" that is associated with a row count of 3.

Consider if a failure occurs after the third row has been transmitted to the client, but before any additional data is successfully sent to the client from the primary server node. Assume that a failover occurs and that data 424 represents the resubmitted query to a backup server node after a failover. In data 424, the resubmitted query returns the result set in a different order than exists in data 422. Specifically, it is noted that the second and third rows are reversed in data 424 as compared to the same rows in data 422. However, the cumulative checksum at row three for data 424 is "107", which is the same as the cumulative checksum for data 422 at row three, even though a different ordering of rows exist between the two sets of data. After the failover, the cached row count and cumulative checksum at the client is compared against the checksum for the same row count at the backup server node, which in the present example are identical. If the client does not require order-dependency for the rows in the result set, then processing can continue after the interruption using data 424 from the backup server node.

If order-dependency is needed after the failover, then a different checksum approach is utilized according to an embodiment of the invention. In this approach, instead of or in addition to a cumulative checksum, an order-sensitive checksum is maintained at the client. The order-sensitive checksum calculates a checksum value that is dependent upon the order in which values are processed. This means that order-sensitive checksum values will differ if the order of rows are different, even if the set of all row values processed by the checksum algorithm is identical. In one embodiment, order-dependent checksums ($C_o$) are calculated according to the following approach:

Initially $C_o=0$

When adding rows x . . . y to existing cache with rows 1 . . . (x−1)

For (row i from x . . . y)

$C_o$=o_checksum($C_o$, column values of row i).

In the above approach, "o_checksum" is an instance of a checksum function with "$C_o$" and "column values of row i" as arguments.

To illustrate this aspect according to an embodiment of the invention, FIG. 6 shows first data 622 responsive to a database query. As shown, the checksum for the first row of data has a value of "30," and therefore the cumulative checksum for the first row of data is also "30". Assume that the order-dependent checksum for the first row has a value of "5." The checksum for the second row of data is "36," resulting in a cumulative checksum value of 30+36=66. Assume that the order-dependent checksum for row two has a value of "23." The checksum for the third row of data is "41," and therefore the cumulative checksum for the third row is 66+41=107. Further assume that the order-dependent checksum for the third row is "43." After the third row is successfully transmitted to the client, the client will also maintain a row count of "3" to indicate that three rows of data have been successfully transmitted. In an embodiment, the order-dependent checksum value for the third row will also be cached at the client.

Consider if a failure occurs before any additional data is successfully transmitted to the client, and that data 624 represents the resubmitted query to a backup server node after a failover. In data 624, the resubmitted query returns the result set in a different order than exists in data 622. Specifically, it is noted that the second and third rows are reversed in data 424 as compared to the same rows in data 422. However, the cumulative checksum at row three for data 424 is "107", which is the same as the cumulative checksum for data 422 at row three, even though a different ordering of rows exist between the two sets of data. After the failover, if the cached row count and cumulative checksum at the client is compared against the cumulative checksum for the same row count at the backup server node, then the order inconsistency will not be detected.

In the present example, the third row in data 624 at the backup server node is associated with an order-dependent checksum value of "53," which is different from the third row order-dependent checksum value that was cached at the client from the primary server node (i.e., "43"). If the order-dependent checksum values are compared, then the order inconsistency can be immediately identified. If order-dependency is required at the client, then the previous set of data at the client can be identified as being invalid, the query can be re-executed at the backup server node, and all rows of data are re-delivered from the backup server node to the client.

In an alternate embodiment, the client itself keeps track of the previously fetched sequence of rows and computed checksums. During failover, these sequences can be analyzed to determine whether the fetched rows after the failover are out-of-order. However, handling these activities at the client could be computationally and spatially more expensive than computing the order-sensitive checksum at the server and sending it to the client.

Many applications exist for an order-sensitive failover approach. As just one example, order-sensitive failover can be advantageously employed in conjunction with scrollable cursors.

A "cursor" is a handle to a query execution area, e.g., an area in memory in which a parsed database query statement and other information for processing the query statement is stored. In many database systems, a cursor is an available resource for accessing or parsing query statements embedded within an application. Cursors enable a query statement to retrieve rows from a database table into a given result set, which can then be accessed, displayed, or operated upon. A cursor can often be utilized like a pointer to a specific row in a result set. When the cursor is active, operations can be performed against the specific row or group of rows at which the cursor is pointing. Traditionally, the only allowed movement of the cursor was sequential, starting at the first row retrieved by the query expression and ending with the last row. Each row of data in this approach is fetched, operated upon, and then released in sequential order. Under the sequential cursor approach, if a failover occurs, then an order-insensitive checksum routine can be employed to verify data at the backup server node. Since the sequential cursor can only move forward, the order-insensitive checksum routine only needs to verify that a given set of rows previously seen by the client matches the same set of rows at the backup server, even if the order of rows at the backup server differs. Because the cursor cannot move backwards, the client does not "care" that the order of rows previously seen may be different at the backup server node.

A recent advance is the scrollable cursor, which allows movement of the cursor in either the forward and backward directions, thereby permitting rows to be accessed in any order. In this approach, the cursor can be moved in any direction to access a row of data, even for data that was earlier fetched. One approach for implementing a scrollable cursor is to use a multi-tier caching structure, in which a partial result set is cached at the client computer and a more-complete result set is cached at the server computer. If the cursor is scrolled in either the forward or backward directions, the partial result set cached at the client computer is first checked to see if requested data is present. If so, then the requested data is fetched from the client cache and the current position of the cursor is moved to the appropriate position in the result set. If the requested data is not present in the client cache, then those data items are fetched from the cache at the server computer. Additional details of an exemplary approach for implementing scrollable cursors is disclosed in co-pending U.S. application Ser. No. 10/144,665 filed May 10, 2002 entitled "Method and System for Scrollable Cursors" filed on even date herewith, which is hereby incorporated by reference in its entirety.

Since scrollable cursors may be scrolled in either direction, it is possible that a set of row/column values previously fetched by a client may need to exist in the same order at the backup server node to provide for a consistent set of data after a failover. The order-sensitive checksum approach set forth above guarantees with a high degree of approximation that the set of row/column values of rows fetched during time-2 is the same as the set of row/column values fetched during time-1.

Figure 7:
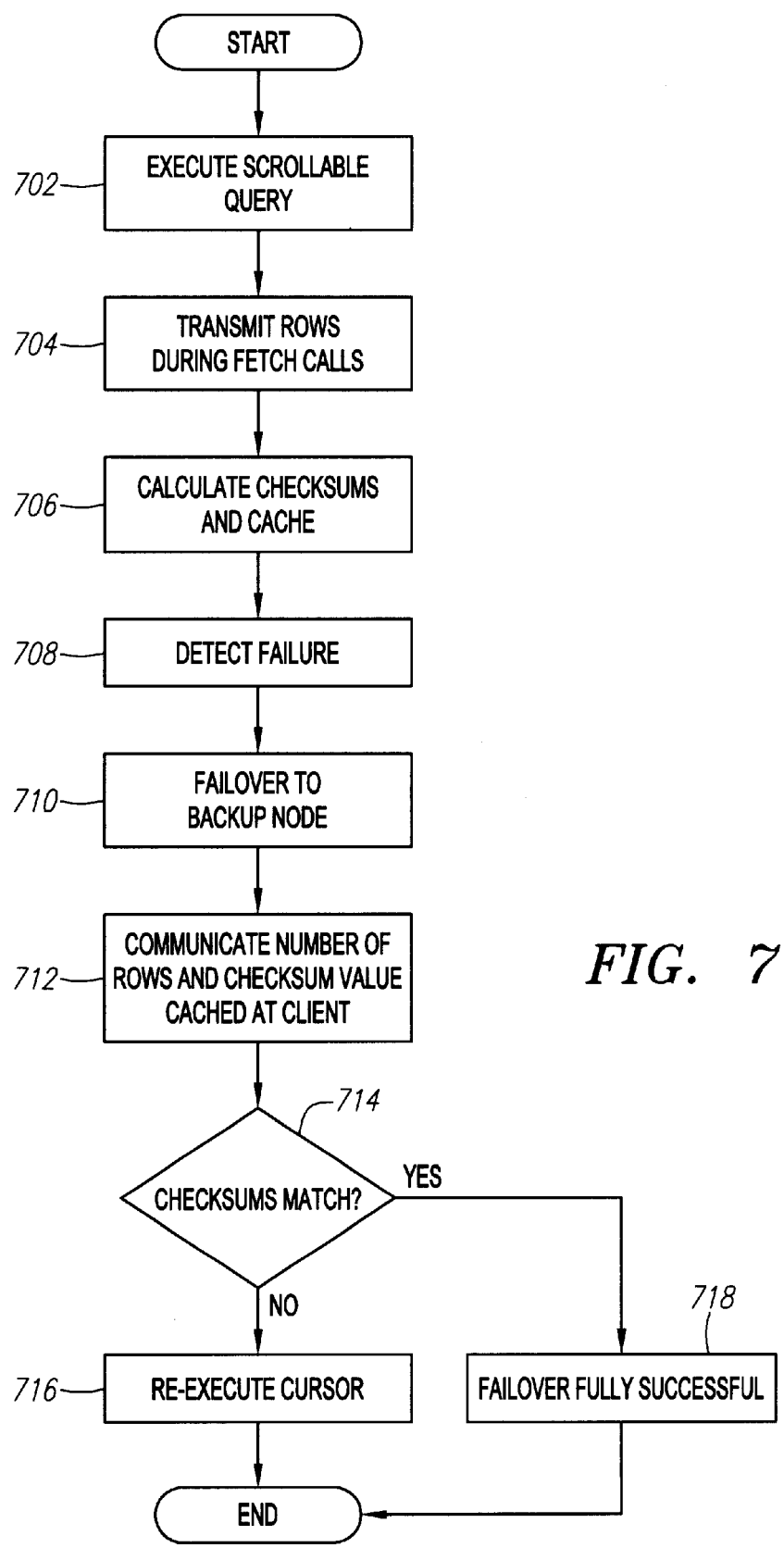
FIG. 7 is a flowchart of a process for implementing failover for a scrollable cursor according to an embodiment of the invention.

FIG. 7 is a flowchart of a process for implementing failover for scrollable cursors according to an embodiment of the invention. At 702, the scrollable cursor is executed at the primary server node with the failover option enabled. In an embodiment, failover semantics are employed to enable the failover option. At 704, rows of data in the result set fetched to the client, e.g., in response to a scroll command at a client user interface. During every transmit of row-data to the client, the server communicates to the client the present high-row count/number of rows cached and the order-dependent checksum (706). In one embodiment, highest-row count/number of cached rows R is established as $R=(x-1)+(y-x+1)=y$, where R refers to the highest row count seen by the client, 1 . . . x are the rows previously cached at the server, and x+1 . . . y are the rows newly added to the server-side cache for the fetch call. In an alternate embodiment, if R has not changed in the current fetch call, then the server need not compute another checksum, and it need not send the same R value and checksum to the client.

When a crash at the primary server node is detected (708), a failover occurs to a backup server node (710). The client re-executes the scrollable cursor after establishing contact with the backup server node. During the re-execution of the cursor, the client communicates the high-row count/cached rows count value (R) and order-dependent checksum ($C_{o\_client}$) to the server (712). While the backup server node is caching rows 1 . . . y, the order-dependent checksum ($C_{o\_server}$) for those rows are calculated as follows:

Initially $C_{o\_server}=0$
For (row i from x . . . y)
$C_{o\_server}=$o_checksum($C_{o\_server}$, column values of row i).

The value of $C_{o\_sever}$ is compared against the value of $C_{o\_client}$ to determine if the set and order of rows in the result set previously returned to the client matches the result set presently compiled at the backup server node (714). If the checksum values do not match, then an error condition is identified for the failover/statement handle. In an embodiment, the client will re-execute the statement handle (716), but will not communicate failover information such as R and $C_o$ to indicate a new execute operation by the application/user. If the checksum values match, then the failover is identified as being successful (718).

The following is an example of a checksum function according to an embodiment of the invention. The sample checksum function is a hash function that can be used for both cumulative and order-sensitive checksums:

Types:
q is a positive integer.
a, b, c, d, e, k[q], s[q], i[q] are values in {0,1,2,3}.
f(a) returns b.
g(c,d) returns e.
Definitions:
f(0)=3, f(1)=2, f(2)=0, f(3)=1.
g(a,b) returns f(a+b mod 4).
k is a list of keys. k[q] is the qth key.
k[q+1] does not depend on k[0] through k[q].
s is an order-sensitive hash. s[q] is the cumulative hash of k[0] through k[q-1].
s[0]=0, s[q+1]=g(k[q], s[q]).
i is an order-insensitive hash. i[q] is the cumulative hash of k[0] through k[q-1].
i[0]=0, i[q+1]=i[q]+g(k[q], 0) mod 4.

Computation of s and i for k[0]=1, k[1]=3:
s[1]=g(k[0], s[0])=g(1, 0)=f(1+0)=f(1)=2
s[2]=g(k[1], s[1])=g(3, 2)=f(3+2)=f(1)=2
i[1]=i[0]+g(k[0], 0)=0+g(1, 0)=0+f(1+0)=0+f(1)=0+2=2
i[2]=i[1]+g(k[1], 0)=2+g(3, 0)=2+f(3+0)=2+f(3)=2+1=3
Computation of s and i for k[0]=3, k[1]=1:
s[1]=g(k[0], s[0])=g(3, 0)=f(3+0)=f(3)=1
s[2]=g(k[1], s[1])=g(1, 1)=f(1+1)=f(2)=0
i[1]=i[0]+g(k[0], 0)=0+g(3, 0)=0+f(3+0)=0+f(3)=0+1=1
i[2]=i[1]+g(k[1], 0)=1+g(1, 0)=1+f(1+0)=1+f(1)=1+2=3
Note that in this embodiment, s[2] is different for different orders of k, but i[2] is the same.

In one approach for implementing these hashes, if there are two lists of q keys that are the same values but in different orders, s[q] is expected to be the same one fourth of the time (because there are four possible hash values), but i[q] would always be the same. Other order-sensitive hashes may also be employed in embodiments of the invention. For example, embodiments of the invention may employ the order-sensitive hash approach disclosed in the Algorithm Alley section of "Dr. Dobb's Journal", September 1997 issue, which is hereby incorporated by reference in its entirety, which discloses an approach for hashing the columns in a row in a SQL table with order-sensitivity.

Transaction Processing Recovery

Referring again to FIG. 3, when a transaction is interrupted by the failure of database session 218, client driver interface 204 attempts to continue processing the interrupted transaction. In one embodiment, client driver interface 204 automatically causes database 214 to be rolled back to a state that was valid before database session 218 failed and the transaction was interrupted. Client driver interface 204 can then perform the necessary steps to continue processing the transaction. As mentioned above, pre-parsing may be used to reduce the amount of time required to complete any select command or transaction that was interrupted by failure of database session 220. Pre-parsing in described in detail below.

In another embodiment, savepoints are used to reduce the amount that client driver interface 204 must roll back database 214 to obtain a valid database state after the failure of database session 218. A savepoint is an intermediate marker that can be used to divide transactions into smaller components. At each savepoint, the database system flushes current transaction information to database 214. Thus, when a transaction is interrupted, client driver interface 204 need only rollback the transaction to the most resent savepoint and continue processing the interrupted transaction from the latest savepoint state. This can significantly reduce the extra processing that is required in rolling back the entire transaction and then resubmitting the whole transaction for processing.

In an alternate embodiment, database 214 is rolled back to a valid state whenever database session 218 fails. User 200 is notified that database session 218 failed and that a rollback has occurred. User 200 can then resubmit all select commands and transactions that were interrupted by failure of database session 218.

At step 314, client driver interface 204 notifies database application 202 that it is safe to continue accessing database 214. Client driver interface 204 may also cause user 200 to be notified of the status or results of the automatic failover event.

For example, in one embodiment, user 200 is notified that an automatic failover occurred and that user 200 may continue interfacing with database 214.

In another embodiment, user 200 is signaled or notified that a rollback of database 214 occurred and that one or more commands and/or instructions, need to be resubmitted.

In yet another embodiment, user 200 is signaled or notified of the status of the interrupted select command or transaction, once client 216 is connected to database server 210. The status, for example, may contain information as to whether the transaction completed successfully or that user 200 must resubmit part or all of the interrupted transaction. Additionally, the status may contain information as to whether the client driver interface 204 could successfully complete the select command or whether user 200 must resubmit the select command request.

At step 316, the automatic failover sequence is complete as database session 220 now connects client 216 to database server 210, enabling user 200 to continue accessing database 214 by causing client 216 to submit database language commands through session 220.

Pre-parsing at a Backup Server

Figure 5:
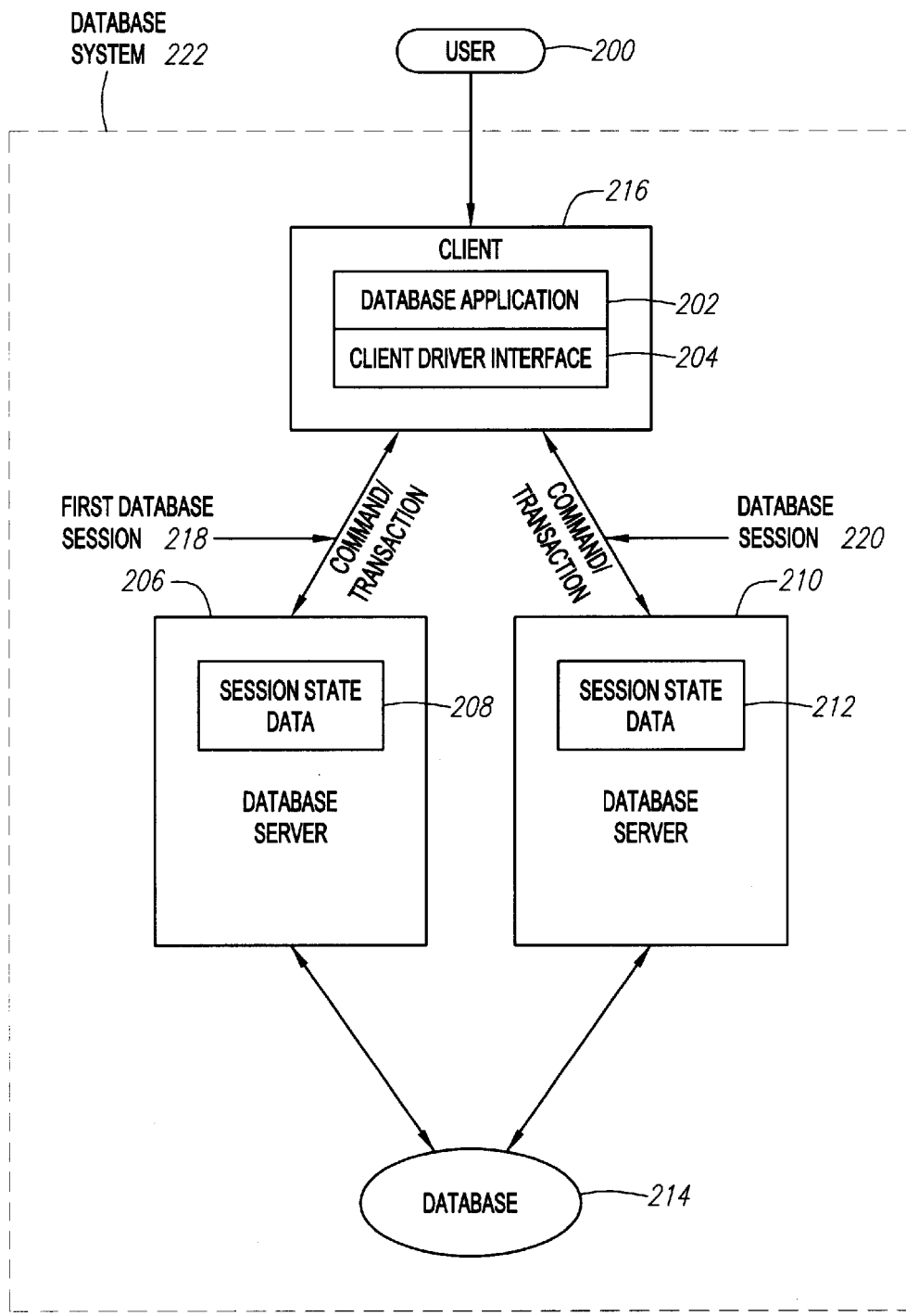
FIG. 5 is a block diagram of a database system in which the technique of pre-parsing is implemented to enable the completion of commands and transactions that were interrupted by a database session failure according to an embodiment of the invention.

Pre-parsing is a technique that can reduce the overhead associated with connecting to an active database server and completing a command or transaction that was interrupted by the failure of a database session. FIG. 5 is an illustration of one embodiment that supports pre-parsing at a backup server. This view is similar to that of FIG. 2, and like reference numerals are employed to refer to like components.

The pre-parse mechanism requires that client 216 be connected to both database server 206 and database server 210. The connection from client 216 to database server 206 and database server 210 is through database session 218 and database session 220, respectively. Client driver interface 204 may establish these connections when user 200 initially logs on.

According to one embodiment, whenever client driver interface 204 submits a command or transaction to database server 206, client driver interface 204 causes the same command or transaction to be parsed, but not executed, on database server 210. This allows database server 210 and session state data 212 to reflect the identical state of database server 206 and session state data 208 respectively. Thus, when database session 218 fails, client driver interface 204 can continue processing any interrupted command or transaction on database server without having to resubmit the commands or transactions through database session 220.

System Architecture Overview

Figure 1:
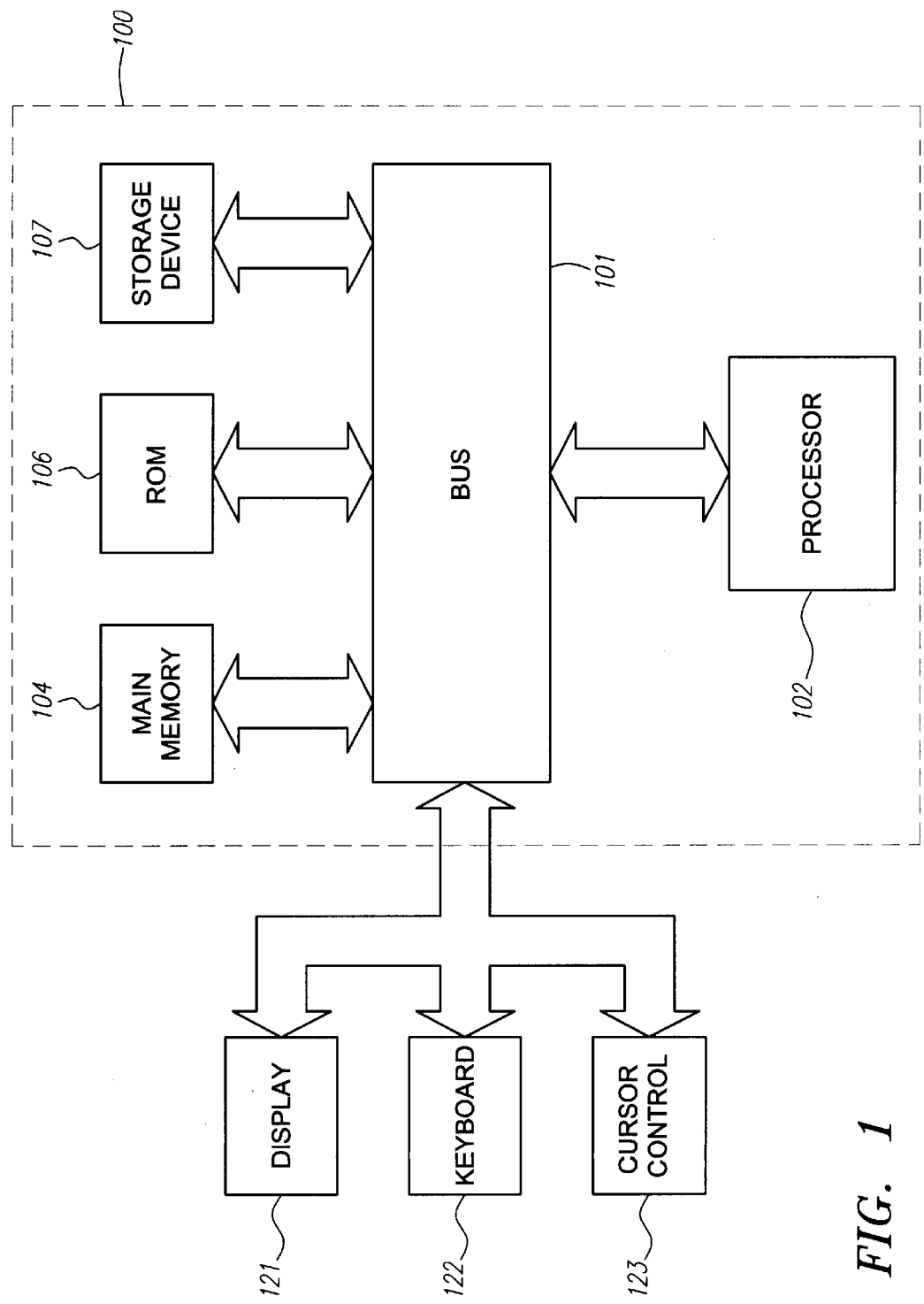
FIG. 1 is a block diagram of a computer system that may be used to implement the present invention.

Referring to FIG. 1, disclosed is a computer system 100 upon which an embodiment of the present invention can be implemented. Computer system 100 comprises a bus 101 or other communication means for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

According to one embodiment of the invention, individual processing units perform specific operations by their respective processor(s) executing one or more sequences of one or more instructions contained in the main memory. Such instructions may be read into the main memory from a computer-usable medium. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s). Such a medium may take many forms, including, but not limited to, non-volatile, volatile and transmission media. Non-volatile media, i.e., media that can retain information in the absence of power, includes the ROM. Volatile media, i.e., media that can not retain information in the absence of power, includes the main memory. Transmission media includes coaxial cables, copper wire and fiber optics, including the wires that comprise the bus. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor can retrieve information.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for recovering after the failure of a first server to which a client was connected for accessing a resource, the method comprising:

connecting a client to a first server node to access a resource for using a scrollable cursor;

recording state information for the connection between the client and the first server node, the state information comprising an order-sensitive checksum;

detecting that a connection between the first server node and the client has failed;

automatically connecting the client with a second server node, the second server node configurable to access the resource, wherein the state information is utilized to determine whether the client can continue processing with previously accessed data transmitted from the first server node; and allowing the client to continue processing with the previously accessed data transmitted from the first server node if the state information indicates consistency with newly accessed data from the second server node.

2. The method of claim 1 in which the state information comprises a count of successfully transmitted data.

3. The method of claim 2 in which the count comprises a row count.

4. The method of claim 1 in which the following is employed to calculate the order-sensitive checksum ($C_o$):

Initially $C_o=0$

When adding rows x . . . y to existing cache with rows 1 . . . (x−1)

For (row i from x . . . y)

$C_o$=checksum_function($C_o$, column values of row i).

5. The method of claim 1 in which a folding process is employed to calculate the order-sensitive checksum.

6. The method of claim 1 further comprising comparing a first order-sensitive checksum value with a second order-sensitive checksum value, in which the first order-sensitive checksum value corresponds to the connection between the client and the first server node and the second order-sensitive checksum value corresponds to the connection between the client and the second server node.

7. The method of claim 6 in which an identified inconsistency between the first order-sensitive checksum value and the second order-sensitive checksum value determines that the client should not continue processing the previously accessed data transmitted from the first server node.

8. The method of claim 7 in which a query data set from the second server node is retransmitted to the client after the inconsistency is identified.

9. The method of claim 1 in which the order-sensitive checksum is not transmitted if the previously accessed data has not changed.

10. The method of claim 1 in which the scrollable cursor on the client utilizes information fetched from the resource.

11. The method of claim 1 in which the previously accessed data transmitted from the first server node is fully or partially cached at the client.

12. A method for recovering after the failure of a server to which a client is connected, the method comprising:

a) executing a scrollable cursor at a primary server node;

b) transmitting state information from the primary server node to the client during a fetch communication, the state information comprising a row count and an order-sensitive checksum value;

c) detecting a failure in communications between the primary server node and the client;

d) re-executing the scrollable cursor at a backup server node;

e) comparing the order-sensitive checksum value against a second order-sensitive checksum value, the second order-sensitive checksum value derived at the backup server node using the row count; and f) allowing the client to continue processing with previously accessed data transmitted from the primary server node if consistency is identified between the order-sensitive checksum value and the second order-sensitive checksum value.

13. The method of claim 12 in which the following is employed to calculate the order-sensitive checksum ($C_o$):

Initially $C_o=0$

When adding rows x . . . y to existing cache with rows 1 . . . (x−1)

For (row i from x . . . y)

$C_o$=checksum_function($C_o$, column values of row i).

14. The method of claim 12 in which a folding process is employed to calculate the order-sensitive checksum.

15. The method of claim 12 in which a query data set from the second server node is retransmitted to the client if inconsistency is identified.

16. The method of claim 12 in which the previously accessed data transmitted from the primary server node is fully or partially cached at the client.

17. A computer program product comprising a computer usable medium having executable code to execute a process for recovering after the failure of a server to which a client is connected, the process comprising:

a) executing a scrollable cursor at a primary server node;

b) transmitting state information from the primary server node to the client during a fetch communication, the state information comprising a row count and an order-sensitive checksum value;

c) detecting a failure in communications between the primary server node and the client;

d) re-executing the scrollable cursor at a backup server node;

e) comparing the order-sensitive checksum value against a second order-sensitive checksum value, the second order-sensitive checksum value derived at the backup server node using the row count; and f) allowing the client to continue processing with previously accessed data transmitted from the primary server node if consistency is identified between the order-sensitive checksum value and the second order-sensitive checksum value.

18. The computer program product of claim 17 in which the following is employed to calculate the order-sensitive checksum ($C_o$):

Initially $C_o=0$

When adding rows x . . . y to existing cache with rows 1 . . . (x−1)

For (row i from x . . . y)

$C_o$=checksum_function($C_o$, column values of row i).

19. The computer program product of claim 17 in which a folding process is employed to calculate the order-sensitive checksum.

20. The computer program product of claim 17 in which a query data set from the second server node is retransmitted to the client if inconsistency is identified.

21. The computer program product of claim 17 in which the previously accessed data transmitted from the primary server node is fully or partially cached at the client.

22. A system for recovering after the failure of a server to which a client is connected, the system comprising:

a) means for executing a scrollable cursor at a primary server node;
b) means for transmitting state information from the primary server node to the client during a fetch communication, the state information comprising a row count and an order-sensitive checksum value;
c) means for detecting a failure in communications between the primary server node and the client;
d) means for re-executing the scrollable cursor at a backup server node;
e) means for comparing the order-sensitive checksum value against a second order-sensitive checksum value, the second order-sensitive checksum value derived at the backup server node using the row count; and
f) means for allowing the client to continue processing with previously accessed data transmitted from the primary server node if consistency is identified between the order-sensitive checksum value and the second order-sensitive checksum value.

23. The system of claim 22 in which the following is employed to calculate the order-sensitive checksum ($C_o$):
Initially $C_o=0$
When adding rows x ... y to existing cache with rows 1 ... (x−1)
For (row i from x ... y)
$C_o$=checksum_function($C_o$, column values of row i).

24. The system of claim 22 in which a folding process is employed to calculate the order-sensitive checksum.

25. The system of claim 22 in which a query data set from the second server node is retransmitted to the client if inconsistency is identified.

26. The system of claim 22 in which the previously accessed data transmitted from the primary server node is fully or partially cached at the client.

27. A method for recovering after failure of a first server to which a client was connected for accessing a resource, the method comprising:
detecting that a connection between the first server and the client has failed;
automatically connecting the first client with a second server that has access to the resource; and
accessing the resource through the second server, wherein an order-sensitive checksum is employed to verify usability of the resource.

28. The method of claim 27 in which the following is employed to calculate the order-sensitive checksum ($C_o$):
Initially $C_o=0$
When adding rows x ... y to existing cache with rows 1 ... (x−1)
For (row i from x ... y)
$C_o$=checksum_function($C_o$, column values of row i).

29. The method of claim 27 further comprising comparing a first order-sensitive checksum value with a second order-sensitive checksum value, in which the first order-sensitive checksum value corresponds to the connection between the client and the first server and the second order-sensitive checksum value corresponds to the connection between the client and the second server.

30. The method of claim 29 in which an identified inconsistency between the first order-sensitive checksum value and the second order-sensitive checksum value determines that the client should not continue processing the previously accessed data transmitted from the first server.

31. The method of claim 30 in which a query data set from the second server is retransmitted to the client after the inconsistency is identified.

32. The method of claim 27 in which a scrollable cursor on the client utilizes information fetched from the resource.

33. A computer program product that includes a computer readable medium, the computer readable medium comprising instructions which, when executed by a processor, causes the processor to execute a process for recovering after the failure of a first server to which a client was connected for accessing a resource, the process comprising:
connecting a client to a first server node to access a resource for using a scrollable cursor;
recording state information for the connection between the client and the first server node, the state information comprising an order-sensitive checksum;
detecting that a connection between the first server node and the client has failed;
automatically connecting the client with a second server node, the second server node configurable to access the resource, wherein the state information is utilized to determine whether the client can continue processing with previously accessed data transmitted from the first server node; and
allowing the client to continue processing with the previously accessed data transmitted from the first server node if the state information indicates consistency with newly accessed data from the second server node.

34. The computer program product of claim 33 in which the state information comprises a count of successfully transmitted data.

35. The computer program product of claim 34 in which the count comprises a row count.

36. The computer program product of claim 33 in which the following is employed to calculate the order-sensitive checksum ($C_o$):
Initially $C_o=0$
When adding rows x ... y to existing cache with rows 1 ... (x−1)
For (row i from x ... y)
$C_o$=checksum_function($C_o$, column values of row i).

37. The computer program product of claim 33 in which a folding process is employed to calculate the order-sensitive checksum.

38. The computer program product of claim 33, wherein the process further comprises comparing a first order-sensitive checksum value with a second order-sensitive checksum value, in which the first order-sensitive checksum value corresponds to the connection between the client and the first server node and the second order-sensitive checksum value corresponds to the connection between the client and the second server node.

39. The computer program product of claim 38 in which an identified inconsistency between the first order-sensitive checksum value and the second order-sensitive checksum value determines that the client should not continue processing the previously accessed data transmitted from the first server node.

40. The computer program product of claim 39 in which a query data set from the second server node is retransmitted to the client after the inconsistency is identified.

41. The computer program product of claim 33 in which the order-sensitive checksum is not transmitted if the previously accessed data has not changed.

42. The computer program product of claim 33 in which the scrollable cursor on the client utilizes information fetched from the resource.

43. The computer program product of claim 33 in which the previously accessed data transmitted from the first server node is fully or partially cached at the client.

44. A system for recovering after the failure of a first server to which a client was connected for accessing a resource, the system comprising:
  means for connecting a client to a first server node to access a resource for using a scrollable cursor;
  means for recording state information for the connection between the client and the first server node, the state information comprising an order-sensitive checksum;
  means for detecting that a connection between the first server node and the client has failed;
  means for automatically connecting the client with a second server node, the second server node configurable to access the resource, wherein the state information is utilized to determine whether the client can continue processing with previously accessed data transmitted from the first server node; and
  means for allowing the client to continue processing with the previously accessed data transmitted from the first server node if the state information indicates consistency with newly accessed data from the second server node.

45. The system of claim 44 in which the state information comprises a count of successfully transmitted data.

46. The system of claim 45 in which the count comprises a row count.

47. The system of claim 44 in which the following is employed to calculate the order-sensitive checksum ($C_o$):
  Initially $C_o=0$
  When adding rows x . . . y to existing cache with rows 1 . . . (x−1)
    For (row i from x . . . y)
      $C_o$=checksum_function($C_o$, column values of row i).

48. The system of claim 44 in which a folding process is employed to calculate the order-sensitive checksum.

49. The system of claim 44 further comprising means for comparing a first order-sensitive checksum value with a second order-sensitive checksum value, in which the first order-sensitive checksum value corresponds to the connection between the client and the first server node and the second order-sensitive checksum value corresponds to the connection between the client and the second server node.

50. The system of claim 49 in which an identified inconsistency between the first order-sensitive checksum value and the second order-sensitive checksum value determines that the client should not continue processing the previously accessed data transmitted from the first server node.

51. The system of claim 50 in which a query data set from the second server node is retransmitted to the client after the inconsistency is identified.

52. The system of claim 44 in which the order-sensitive checksum is not transmitted if the previously accessed data has not changed.

53. The system of claim 44 in which the scrollable cursor on the client utilizes information fetched from the resource.

54. The system of claim 44 in which the previously accessed data transmitted from the first server node is fully or partially cached at the client.

55. A computer program product that includes a computer readable medium, the computer readable medium comprising instructions which, when executed by a processor, causes the processor to execute a process for recovering after failure of a first server to which a client was connected for accessing a resource, the process comprising:
  detecting that a connection between the first server and the client has failed;
  automatically connecting the client with a second server that has access to the resource; and
  accessing the resource through the second server, wherein an order-sensitive checksum is employed to verify usability of the resource.

56. The computer program product of claim 55 in which the following is employed to calculate the order-sensitive checksum ($C_o$):
  Initially $C_o=0$
  When adding rows x . . . y to existing cache with rows 1 . . . (x−1)
    For (row i from x . . . y)
      $C_o$=checksum_function($C_o$, column values of row i).

57. The computer program product of claim 55, wherein the process further comprises comparing a first order-sensitive checksum value with a second order-sensitive checksum value, in which the first order-sensitive checksum value corresponds to the connection between the client and the first server and the second order-sensitive checksum value corresponds to the connection between the client and the second server.

58. The computer program product of claim 57 in which an identified inconsistency between the first order-sensitive checksum value and the second order-sensitive checksum value determines that the client should not continue processing the previously accessed data transmitted from the first server.

59. The computer program product of claim 58 in which a query data set from the second server is retransmitted to the client after the inconsistency is identified.

60. The computer program product of claim 55 in which a scrollable cursor on the client utilizes information fetched from the resource.

61. A system for recovering after failure of a first server to which a client was connected for accessing a resource, the system comprising:
  means for detecting that a connection between the first server and the client has failed;
  means for automatically connecting the client with a second server that has access to the resource; and
  means for accessing the resource through the second server, wherein an order-sensitive checksum is employed to verify usability of the resource.

62. The system of claim 61 in which the following is employed to calculate the order-sensitive checksum ($C_o$):
  Initially $C_o=0$
  When adding rows x . . . y to existing cache with rows 1 . . . (x−1)
    For (row i from x . . . y)
      $C_o$=checksum_function($C_o$, column values of row i).

63. The system of claim 61 further comprising means for comparing a first order-sensitive checksum value with a second order-sensitive checksum value, in which the first order-sensitive checksum value corresponds to the connection between the client and the first server and the second order-sensitive checksum value corresponds to the connection between the client and the second server.

64. The system of claim 63 in which an identified inconsistency between the first order-sensitive checksum value and the second order-sensitive checksum value determines that the client should not continue processing the previously accessed data transmitted from the first server.

65. The system of claim 64 in which a query data set from the second server is retransmitted to the client after the inconsistency is identified.

66. The system of claim 61 in which a scrollable cursor on the client utilizes information fetched from the resource.

* * * * *